US010650004B2

(12) United States Patent
Yuan et al.

(10) Patent No.: US 10,650,004 B2
(45) Date of Patent: *May 12, 2020

(54) SELF-GUIDED VERIFICATION OF AN ITEM

(71) Applicant: eBay Inc., San Jose, CA (US)

(72) Inventors: Mark Delun Yuan, San Mateo, CA (US); Neelakantan Sundaresan, Mountain View, CA (US)

(73) Assignee: EBAY INC., San Jose, CA (US)

( * ) Notice: Subject to any disclaimer, the term of this patent is extended or adjusted under 35 U.S.C. 154(b) by 255 days.

This patent is subject to a terminal disclaimer.

(21) Appl. No.: 15/821,122

(22) Filed: Nov. 22, 2017

(65) Prior Publication Data

US 2018/0157715 A1 Jun. 7, 2018

Related U.S. Application Data

(63) Continuation of application No. 13/838,626, filed on Mar. 15, 2013, now Pat. No. 9,842,142.

(51) Int. Cl.
*G06F 7/00* (2006.01)
*G06F 17/00* (2019.01)
*G06F 16/2457* (2019.01)
*G06Q 30/02* (2012.01)

(52) U.S. Cl.
CPC ... *G06F 16/24573* (2019.01); *G06Q 30/0248* (2013.01)

(58) Field of Classification Search
CPC .................. G06F 17/30525; G06Q 30/0248
USPC ......................................... 707/690
See application file for complete search history.

(56) References Cited

U.S. PATENT DOCUMENTS

| 6,026,374 A * | 2/2000 | Chess ................... G06Q 20/02 705/26.41 |
| 7,818,392 B1 * | 10/2010 | Martino ................ G06Q 10/10 709/217 |
| 7,958,019 B2 * | 6/2011 | Ahmed .............. G06Q 30/0637 705/26.82 |
| 7,970,665 B1 * | 6/2011 | Lifson ................... G06Q 10/10 705/26.7 |
| 9,842,142 B2 | 12/2017 | Yuan et al. |
| 2003/0154398 A1 * | 8/2003 | Eaton ..................... G06Q 30/08 709/227 |
| 2007/0005390 A1 * | 1/2007 | Morgan ............... G06Q 10/087 705/317 |
| 2007/0143281 A1 * | 6/2007 | Smirin ................ G06F 16/9535 |
| 2007/0214259 A1 * | 9/2007 | Ahmed .................. G06Q 30/02 709/224 |

(Continued)

OTHER PUBLICATIONS

Final Office Action received for U.S. Appl. No. 13/838,626, dated Jul. 17, 2015, 20 pages.

(Continued)

*Primary Examiner* — Binh V Ho
(74) *Attorney, Agent, or Firm* — Shook, Hardy & Bacon

(57) ABSTRACT

A method of providing a level of certification of an attribute of an item is disclosed. A requirement is determined for a level of certification for an attribute of an item. A notification is provided of an evidence item that is to be submitted to evaluate the level of certification of the attribute of the item. The evidence item is received. The level of certification of the attribute of the item is determined based on the received evidence item.

20 Claims, 9 Drawing Sheets

(56) References Cited

U.S. PATENT DOCUMENTS

| | | | | |
|---|---|---|---|---|
| 2008/0016335 A1* | 1/2008 | Takahashi | H04L 9/3263 | 713/156 |
| 2008/0275719 A1* | 11/2008 | Davis | G06Q 30/02 | 705/1.1 |
| 2008/0282184 A1* | 11/2008 | Rose | G06F 16/48 | 715/772 |
| 2009/0089074 A1* | 4/2009 | Schoenberg | G06Q 30/02 | 705/2 |
| 2009/0265791 A1* | 10/2009 | Ourega | G06Q 30/06 | 726/28 |
| 2010/0030638 A1* | 2/2010 | Davis, III | G06Q 30/02 | 705/14.43 |
| 2011/0137726 A1* | 6/2011 | Amatriain | G06N 5/045 | 705/14.52 |
| 2011/0138472 A1* | 6/2011 | Nikitin | G06F 21/105 | 726/26 |
| 2012/0290490 A1* | 11/2012 | Young | G06Q 30/02 | 705/317 |
| 2013/0311337 A1* | 11/2013 | Stoll | H04W 4/21 | 705/26.81 |
| 2013/0317941 A1 | 11/2013 | Stoll et al. | | |
| 2014/0032365 A1* | 1/2014 | Varadarajan | G06Q 30/0601 | 705/26.35 |
| 2014/0236942 A1* | 8/2014 | Li | G06F 16/9535 | 707/735 |
| 2014/0279940 A1 | 9/2014 | Yuan et al. | | |

OTHER PUBLICATIONS

Non-Final Office Action received for U.S. Appl. No. 13/838,626, dated Dec. 18, 2014, 16 pages.
Notice of Allowance received for U.S. Appl. No. 13/838,626, dated Aug. 9, 2017, 10 pages.
Response to Final Office Action filed on Jul. 31, 2017 for U.S. Appl. No. 13/838,626, dated Jul. 17, 2015, 14 pages.
Response to Non-Final Office Action filed on Mar. 18, 2015 for U.S. Appl. No. 13/838,626, dated Dec. 18, 2014, 9 pages.
U.S. Appl. No. 13/838,626 Reply Brief Filed Jan. 3, 2017, 8 pages.
U.S. Appl. No. 13/838,626, Appeal Brief mailed Jun. 27, 2016, 22 pages.
U.S. Appl. No. 13/838,626, Appeal Decision mailed May 31, 2017, 11 pages.
U.S. Appl. No. 13/838,626, Decision on Pre-Appeal Brief Request mailed Jan. 27, 2016, 2 pages.
U.S. Appl. No. 13/838,626, Pre-Appeal Brief Request filed Dec. 17, 2015, 5 pages.

* cited by examiner

SELF-GUIDED VERIFICATION OF AN ITEM

CLAIM OF PRIORITY

This application is a continuation of U.S. application Ser. No. 13/838,626, filed Mar. 15, 2013, which is hereby incorporated by reference in its entirety.

TECHNICAL FIELD

The present application relates generally to the technical field of data processing, and, in one specific example, to enabling a seller of an item to provide proof of an attribute of the item in order to reduce a likelihood that prospective buyers of the item would wish to physically inspect the item to verify the attribute of the item.

BACKGROUND

Various network-based publication systems (e.g., EBAY®, AMAZON®, or CRAIGSLIST®) may facilitate the buying or selling of items (e.g., goods or services) by their users. However, because an item being sold on network-based publication systems is often not available to be physically inspected (e.g., physically handled or viewed) by a prospective buyer of the item prior to an agreement by the prospective buyer to purchase the item, it may be relatively easy for sellers to falsify information about the items they are selling in comparison to an item that is being sold by the seller at a brick-and-mortar store. Fraudulent advertising may reduce an amount of trust of buyers and sellers of items on the network-based publication system, which may, in turn, reduce a profit that an owner of the network-based publication system may receive based on completions of transactions on the network-based publication system. Therefore, it may be beneficial to the owner of the network-based publication system to implement systems and methods to reduce a likelihood that information provided about items by sellers of the items is false information.

BRIEF DESCRIPTION OF THE DRAWINGS

Some embodiments are illustrated by way of example and not limitation in the figures of the accompanying drawings in which.

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

Consistent with various embodiments, a method of providing a level of certification of an attribute of an item is disclosed. A requirement is determined for a level of certification for an attribute of an item. A notification is provided of an evidence item that is to be submitted to evaluate the level of certification of the attribute of the item. The evidence item is received. The level of certification of the attribute of the item is determined based on the received evidence item.

This method and various embodiments disclosed herein may be implemented as a computer system having one or more modules (e.g., hardware modules or software modules). This method and various embodiments disclosed herein may be embodied as instructions stored on a machine-readable medium that, when executed by a processor, cause the processor to perform the method.

Figure 1:
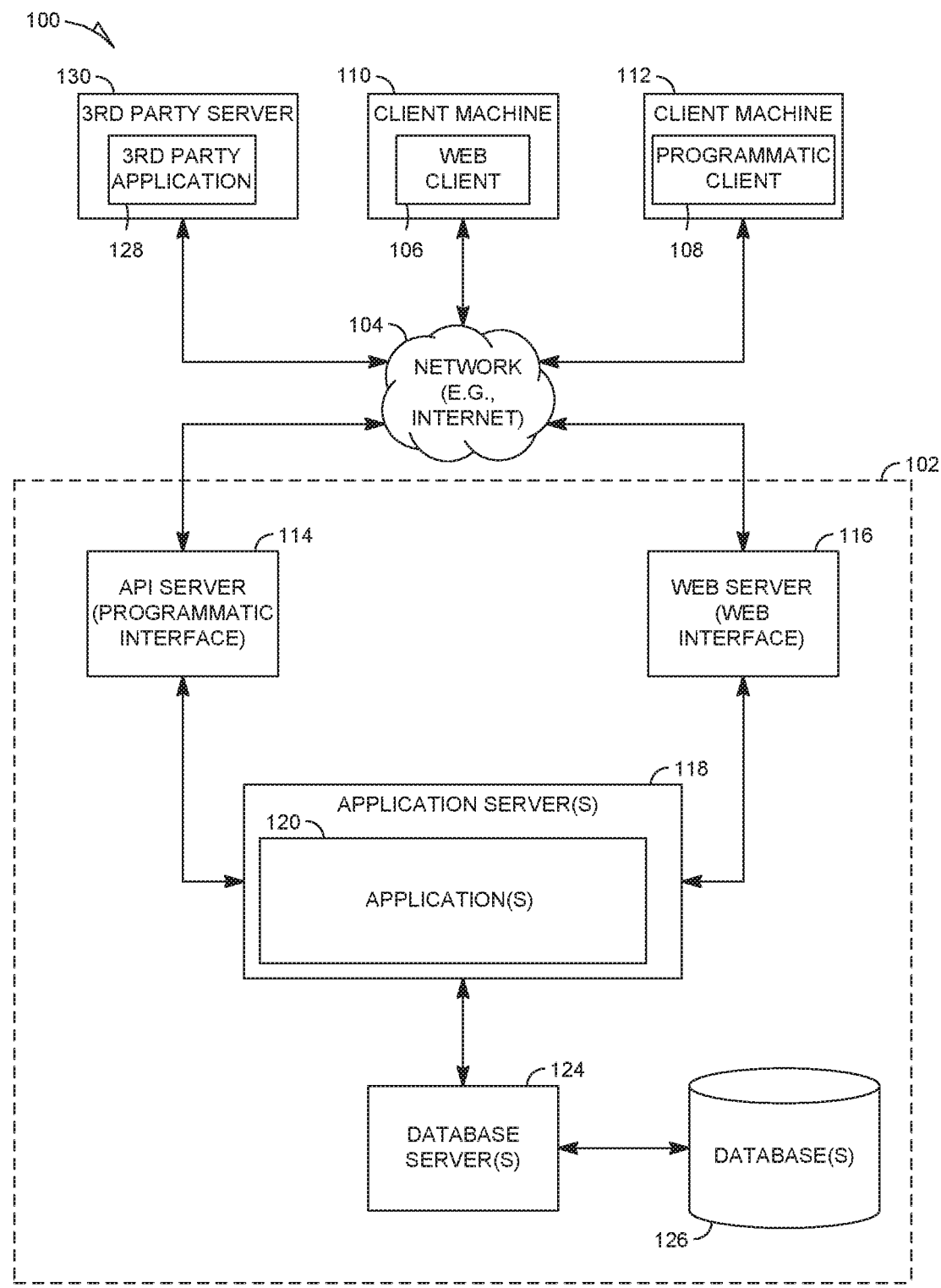
FIG. 1 is a network diagram depicting a client-server system within which various example embodiments may be deployed.

FIG. 1 is a network diagram depicting a system 100 within which various example embodiments may be deployed. A networked system 102, in the example forms of a network-based marketplace or other publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash.) and a programmatic client 108 executing on respective client machines 110 and 112. Each of the one or more clients may include a software application module (e.g., a plug-in, add-in, or macro that adds a specific service or feature to a larger system. The software application module may be separate from but tightly-integrated into a user interface and functionality of a software application, such as a spreadsheet application. The software application may be a client software application executing on a client machine. The software application module may be optionally deployed in the same environment as the software application such that the software application module can be accessed from within the software application. The software application module may be optionally enabled or disabled within the environment (e.g., user interface) of the software application. The software application module may appear to be a part of the software application by, for example, providing user interface components or widgets (e.g., menus, toolbars, menu commands, toolbar commands, and so on) that can be enabled, disabled, added to, or removed from standard user interface components or widgets provided by the software application.

An API server 114 and a web server 116 are coupled to, and provide programmatic and web interfaces respectively to, one or more application servers 118. The application servers 118 host one or more application(s) 120. The application servers 118 are, in turn, shown to be coupled to one or more database servers 124 that facilitate access to one or more databases 126 or data stores, such as NoSQL or non-relational data stores.

The marketplace applications 120 may provide a number of marketplace functions and services to users that access the networked system 102. While the applications 120 are shown in FIG. 1 to form part of the networked system 102, in alternative embodiments, the various applications 120 may form part of a service that is separate and distinct from the networked system 102.

Further, while the system 100 shown in FIG. 1 employs a client-server architecture, various embodiments are, of course, not limited to such an architecture, and could equally well find application in a distributed, or peer-to-peer, architecture system, for example. The various applications 120 could also be implemented as standalone software programs, which do not necessarily have networking capabilities. Additionally, although FIG. 1 depicts machines 130, 110, and 112 as being coupled to a single networked system 102, it will be readily apparent to one skilled in the art that machines 130, 110, and 112, as well as applications 128, 106, and 108, may be coupled to multiple networked systems. For example, the application 128, 106, and 108 may be coupled to applications 120, such as payment applications associated with multiple payment processors (e.g., Visa, MasterCard, and American Express).

The web client 106 accesses the various applications 120 via the web interface supported by the web server 116. Similarly, the programmatic client 108 accesses the various services and functions provided by the applications 120 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third-party application 128, executing on a third-party server machine 130, as having programmatic access to the networked system 102 via the programmatic interface provided by the API server 114. For example, the third-party application 128 may, utilizing information retrieved from the networked system 102, support one or more features or functions on a website hosted by the third party. The third-party website may, for example, provide one or more promotional, marketplace or payment functions that are supported by the relevant applications of the networked system 102.

Figure 2:
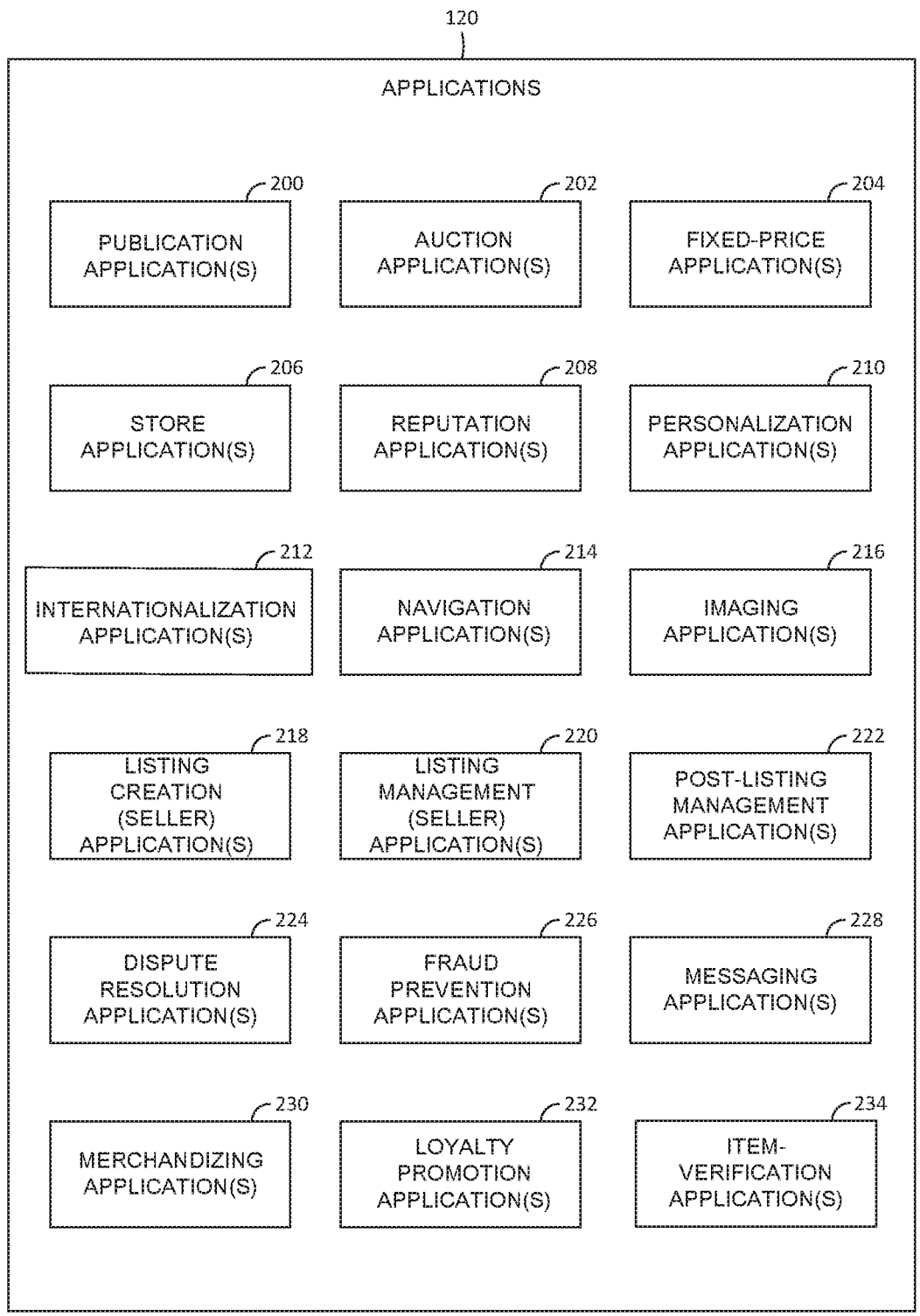
FIG. 2 is a block diagram illustrating multiple applications including the item-verification applications that, in various example embodiments, are provided as part of the networked system of FIG. 1.

FIG. 2 is a block diagram illustrating multiple applications 120 that, in various example embodiments, are provided as part of the networked system 102. The applications 120 may be hosted on dedicated or shared server machines (not shown) that are communicatively coupled to enable communications between server machines. The applications 120 themselves are communicatively coupled (e.g., via appropriate interfaces) to each other and to various data sources, so as to allow information to be passed between the applications 120 so as to allow the applications 120 to share and access common data. The applications 120 may furthermore access one or more databases 126 via the database servers 124.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable keyword searches of listings published via the networked system 102. A browse application may allow users to browse various category, catalogue, or inventory data structures according to which listings may be classified within the networked system 102. Various other navigation applications may be provided to supplement the search and browsing applications.

In order to make listings available via the networked system 102 as visually informing and attractive as possible, the marketplace applications 120 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. The listing creation application 218 and listing management applications 220 may allow sellers to manage listing in bulk (e.g., in a single operation, such as by an uploading of a file) and provide templates for sellers to manage category-specific, vendor-specific, or general-type-specific (e.g., catalog or ticket) listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller to conveniently provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of operations in an attempt to settle a dispute. In the event that the dispute cannot be settled via the guided procedures, the dispute may be escalated to a third-party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102. These messages may, for example, advise users regarding the status of listings at the networked system 102 (e.g., providing "outbid" notices to bidders during an auction process or providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotion applications 232. For example, a buyer may earn loyalty or promotions points for each transaction established and/or concluded with a particular seller, and may be offered a reward for which accumulated loyalty points can be redeemed.

Item-verification applications 234, described in more detail below, may enable sellers of items to back up their assertions pertaining to attributes of the items. For example, a seller may provide proof of an authenticity of an item or of an operability of an item. In various embodiments, the proof may come in the form of a result of following a procedure formulated by experts of a type of the item that the seller is selling to demonstrate that the item has a particular attribute advertised by the seller of the item.

Figure 3:
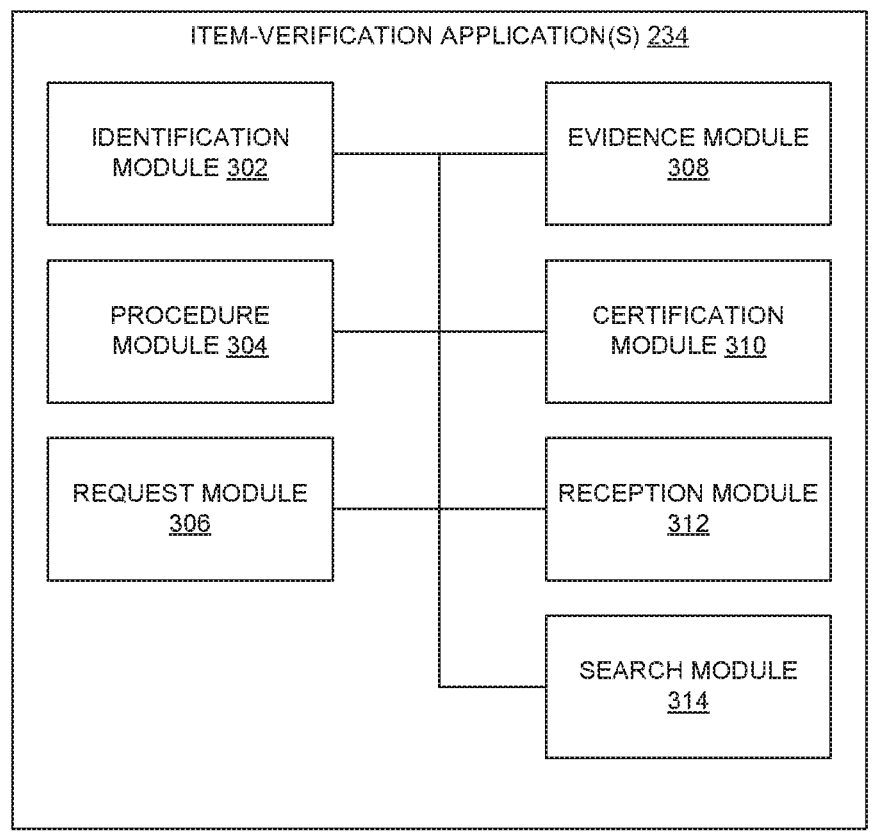
FIG. 3 is a block diagram illustrating example modules of the item-verification applications of FIG. 2.

FIG. 3 is a block diagram illustrating example modules of the item-verification application(s) 234. An identification module 302 may be configured to identify a subset of users from a community of users based on the subset of users having expertise in an item of a particular type. A procedure module 304 may be configured to generate one or more procedures that a seller of an item or a reviewer of an item should complete in order to receive a level of certification for an attribute of an item (e.g., a specific instance or physical specimen of a type of an item that may be listed on a network-based publication system by a seller of the item). A request module 306 may be configured to request evidence items pertaining to the level of certification of the attribute of the item. An evidence module 308 may be configured to receive requested items of evidence. A certification module 310 may be configured to designate an attribute the item as having a level of certification (e.g., based on the receiving of the evidence items). A reception module 312 may be configured to receive a notification that the item has been received by a reviewer of the item. A search module 314 may be configured to generate references to listing items corresponding to keywords in a search query and rank the references based on certification scores corresponding to the references.

Figure 4:
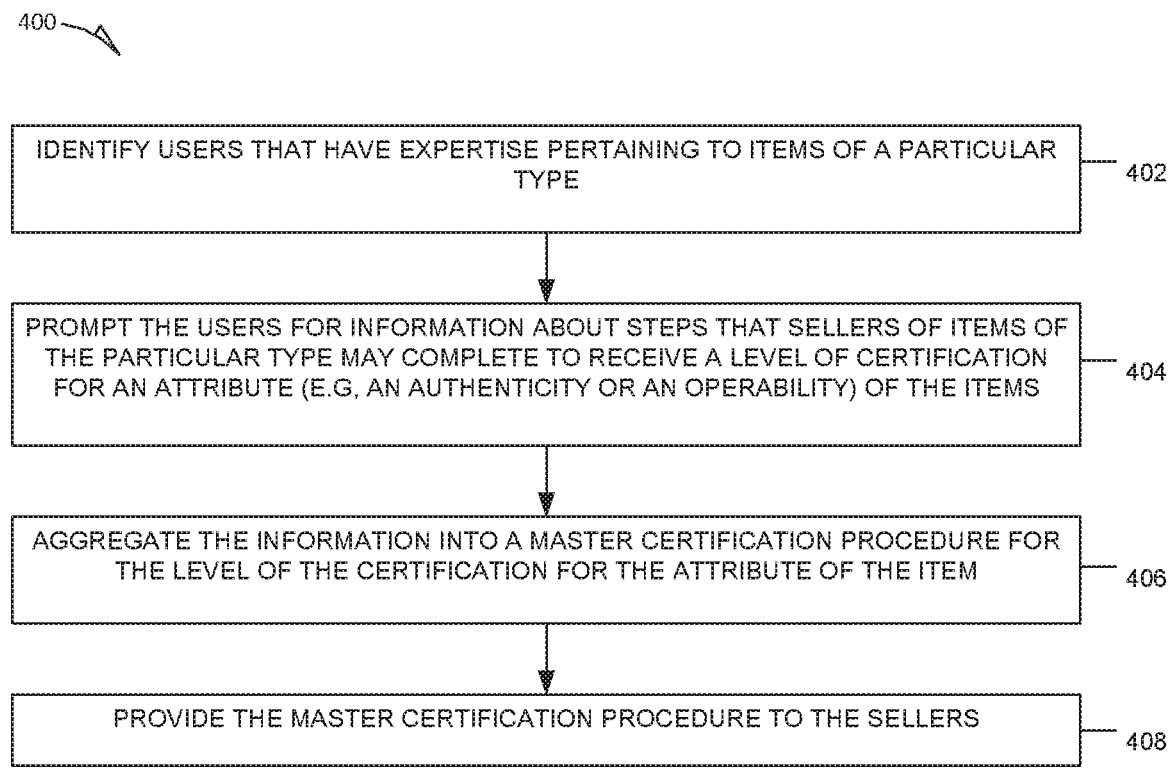
FIG. 4 is a flowchart illustrating an example method 400 of providing a procedure that sellers may use to establish a level of certification for an attribute of an item.

FIG. 4 is a flowchart illustrating an example method 400 of providing a procedure that sellers may use to establish a level of certification for an attribute of an item. Various operations of the method 400 may be performed by the item-verification application(s) 234. At operation 402, the identification module 302 identifies users that have expertise pertaining to items of a particular type. For example, based on a determination that the item is an iPhone, the identification module 302 may identify one or more users having expertise in smart phones. The identification module 302 may identify the users having expertise in the type of the item based on information provided in profiles of the users, feedback provided by the users, or monitoring of behavior of the users. For example, the identification module 302 may identify that a user has expertise in smart phones based on positive feedback received from other users on contributions made by the user to an online forum focusing on discussions pertaining to smart phones.

At operation 404, the procedure module 304 prompts the identified users for information about steps that sellers of items of the particular type should complete to receive a level of certification for an attribute of an item of the particular type. For example, the procedure module 304 may prompt the users (e.g., via email, a user interface screen, and so on) for a step that a seller of a particular iPhone should complete to be eligible to receive a seller-level certification that the iPhone is functional or authentic. For example, one of the identified users may specify that a seller should upload a video of the particular iPhone to the system that shows the particular iPhone being turned on and off in order to receive seller-level certification that the iPhone is operable. Or one of the identified users may specify that the seller should upload an image of a serial number of the particular iPhone being sold in order to receive a seller-level certification that the iPhone is authentic.

Or the procedure module 304 may prompt the users for a step that a seller of the particular item should complete to be eligible to receive a community-level certification of the attribute of the particular item. For example, one of the identified users may specify that the user should receive a positive feedback rating from 95% or higher from the identified users with respect to an attribute of the item of the particular type asserted by the seller in order to receive a community-level certification of the attribute of the item.

Or the procedure module 304 may prompt the users for a step that a seller of the particular item should complete to be eligible to receive an expert-level certification of the attribute of the particular item. For example, one of the identified users may specify that the user should post an image of a certificate of authenticity from a third-party expert who has personally inspected the item in order to receive an expert-level certification of the authenticity of the item.

At operation 406, the procedure module 304 may aggregate the information about the steps into a master certification procedure for the level of certification for the attribute of the item. For example, the procedure module 304 may determine, based on feedback received from the identified users, which of the submitted steps should be required of a seller in order for the seller to be provided with the level of certification for the attribute of the item. Thus, the master certification procedure may represent a consensus of the identified expert users as to which steps the seller should be required to complete in order to receive a particular level of certification of an attribute of an item of a particular type.

At operation 408, the procedure module 304 may provide the master certification procedure to the sellers. For example, when a seller posts a listing for an item of a particular type, the procedure module 304 may provide the seller with steps that the seller may perform to receive a level of certification for an attribute of the item, such as a seller-level certification, community-level certification, or expert-level certification of the authenticity of the item.

Figure 5:
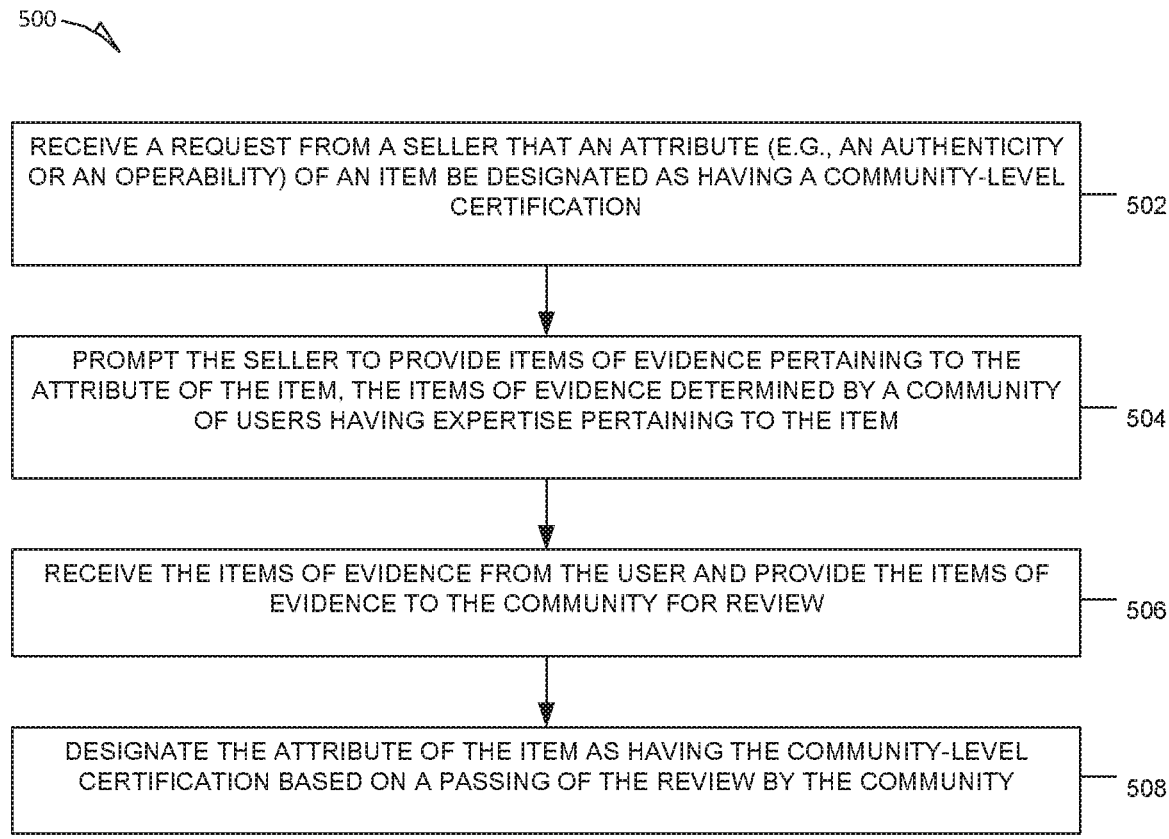
FIG. 5 is a flowchart illustrating an example method 500 of designating an attribute of an item as having a community-level certification.

FIG. 5 is a flowchart illustrating an example method 500 of designating an attribute of an item as having a community-level certification. Various operations of the method 500 may be performed by the item-verification application(s) 234. At operation 502, the request module 306 receives a request from a seller that an attribute (e.g., an authenticity or an operability) of an item be designated as having a community-level certification.

At operation 504, the evidence module 308 prompts the seller to provide items of evidence pertaining to the attribute of the item. In various embodiments, the items of evidence requested by the evidence module 308 are determined by a community of users having expertise pertaining to the item. For example, if the user is selling a particular watch of a particular type, an item of evidence that the community of users may determine should be submitted by the seller may be a video showing the item working properly (e.g., ticking).

At operation 506, the evidence module 308 receives the items of evidence from the user and provides the items of evidence to the community for review. For example, the evidence module 308 receives the video from the seller and posts it on a web page corresponding to a listing of the item on the network-based publication system.

At operation 508, the certification module 310 designates the attribute of the item as having the community-level certification based on a passing of the review by the community. For example, the certification module 310 may receive feedback from the community members on the sufficiency of the evidence provided by the seller to demonstrate the attribute of the item. In various embodiments, the evidence will be deemed sufficient if a percentage of users of the community who vote on the sufficiency of the evidence transgresses a threshold. For example, in various embodiments, the evidence may be deemed sufficient by the certification module 310 if 90% of the users vote that the evidence is sufficient for the seller to receive the community-level certification. In this case, the seller may receive a community-level certification of the attribute of the item.

Figure 6:
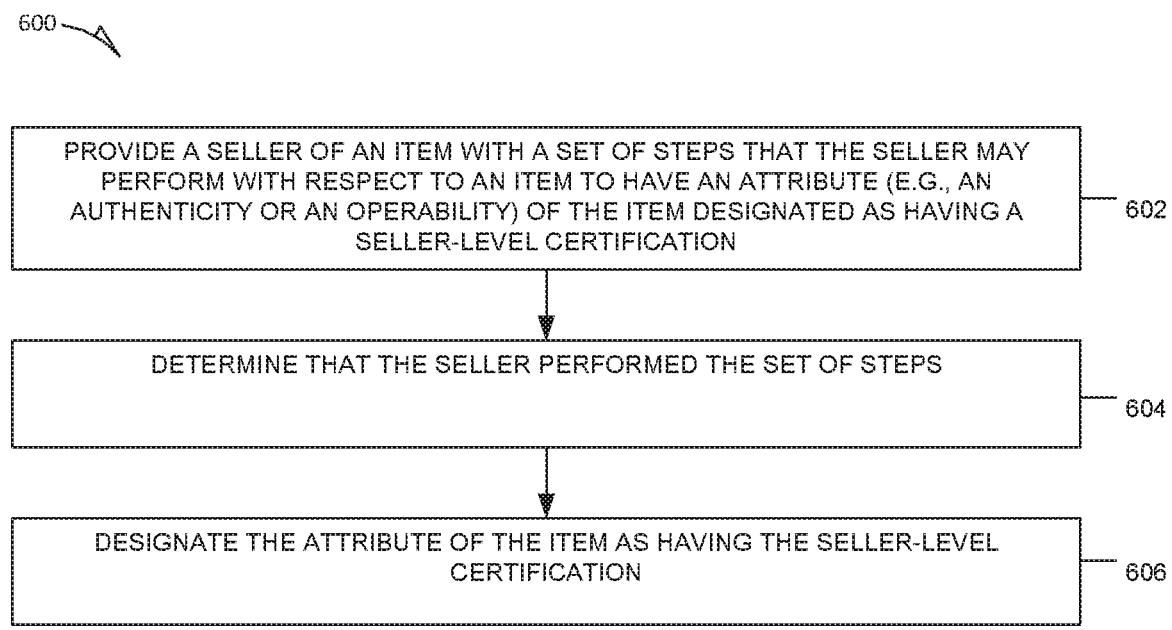
FIG. 6 is a flowchart illustrating an example method 600 of designating an attribute of an item as having a seller-level certification.

FIG. 6 is a flowchart illustrating an example method 600 of designating an attribute of an item as having a seller-level certification. Various operations of the method 600 may be performed by the item-verification application(s) 234. At operation 602, the procedure module 304 provides a seller of the item with a set of steps that the seller may perform to have an attribute (e.g., an authenticity or an operability) of the item designated as having a seller-level certification. For example, the set of steps may include having the seller submit a photo of a serial number of the item to demonstrate an authenticity of the item. Or the set of steps may include submitting a video that shows the item in a working condition.

At operation 604, the evidence module 308 determines that the seller has performed the set of steps. For example, the evidence module 308 may determine that the seller has submitted a video purporting to demonstrate the item functioning properly. Or the evidence module 308 may determine that the seller has submitted a photo purporting to show a serial number of the item.

At operation 606, the certification module 310 designates the attribute of the item as having the seller-level certification (e.g., based on the determining that the seller has performed the set of steps). For example, the certification module 310 may generate an visual representation of the level of certification that is to be displayed on a web site corresponding to the listing of the item on the network-based publication system. In various embodiments, an icon may be associated (e.g., visually) with the attribute of the item to which the seller-level certification applies.

Figure 7:
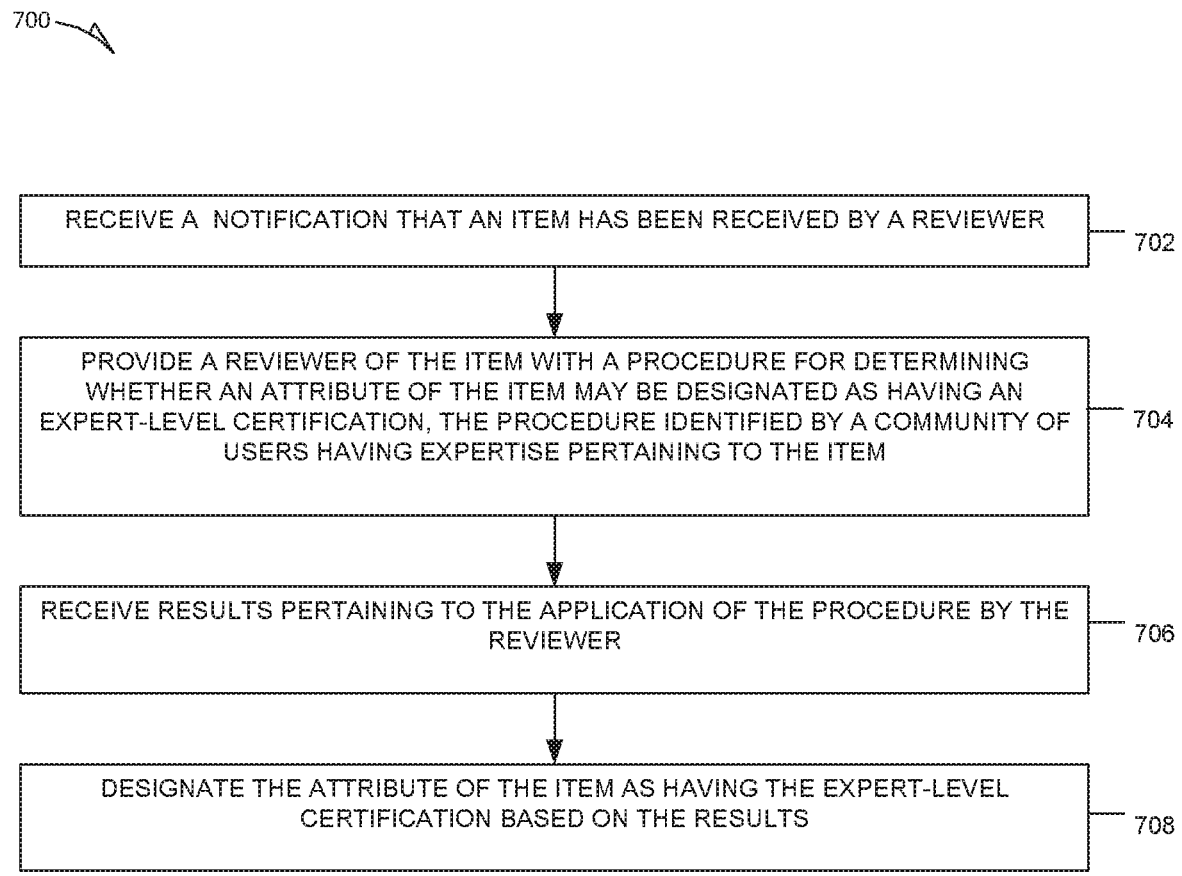
FIG. 7 is a flowchart illustrating an example method 700 of designating an attribute of an item as having an expert-level certification.

FIG. 7 is a flowchart illustrating an example method 700 of designating an attribute of the item as having an expert-level certification. Various operations of the method 700 may be performed by the item-verification application(s)

234. At operation 702, a reception module 312 receives a notification that an item has been received by a reviewer. For example, the item may be received by the reviewer from a seller via mail. Or the item may be received by in-person delivery by the seller to the reviewer. In various embodiments, the reviewer does not have expertise in verifying attributes of item of the particular type.

At operation 704, the procedure module 304 provides the reviewer of the item with a procedure for determining whether one or more attributes of the item may be designated as having an expert-level certification. In various embodiments, the procedure is identified by a community of users having expertise pertaining to the item. For example, if the item is an iPhone, the procedure may be identified by a community of users having expertise in smart phones. Or, if the item is a Toyota RAV4 vehicle, the procedure may be identified by a community of users having expertise in automobiles. The procedure may be identified by the community of users such that the steps of the procedure may be performed by a reviewer who does not have expertise in the type of the item. In other words, although the steps of the procedure may reflect a collective wisdom of a community of users who have expertise in the type of the item, the steps may be designed or selected by the community of users based on a determination that by the community of users that a reviewer who is not an expert in the type of the item may be able to perform the steps.

At operation 706, the evidence module 308 receives results pertaining to the application of the procedure by the reviewer. For example, the evidence module 308 may receive a result from the reviewer that suggests that the item is authentic based on an execution of a set of steps to confirm the authenticity of the item. Or the evidence module 308 may receive a result from the reviewer that suggests the item is operable based on an execution of a set of steps to confirm the operability of the item.

At operation 708, the certification module 310 designates the attribute of the item as having an expert-level certification based on the receiving of the results pertaining to the application of the procedure by the reviewer. For example, the certification module 310 may generate an icon that is to be displayed on a web page corresponding to a list of the item on the network-based publication system.

Figure 8:
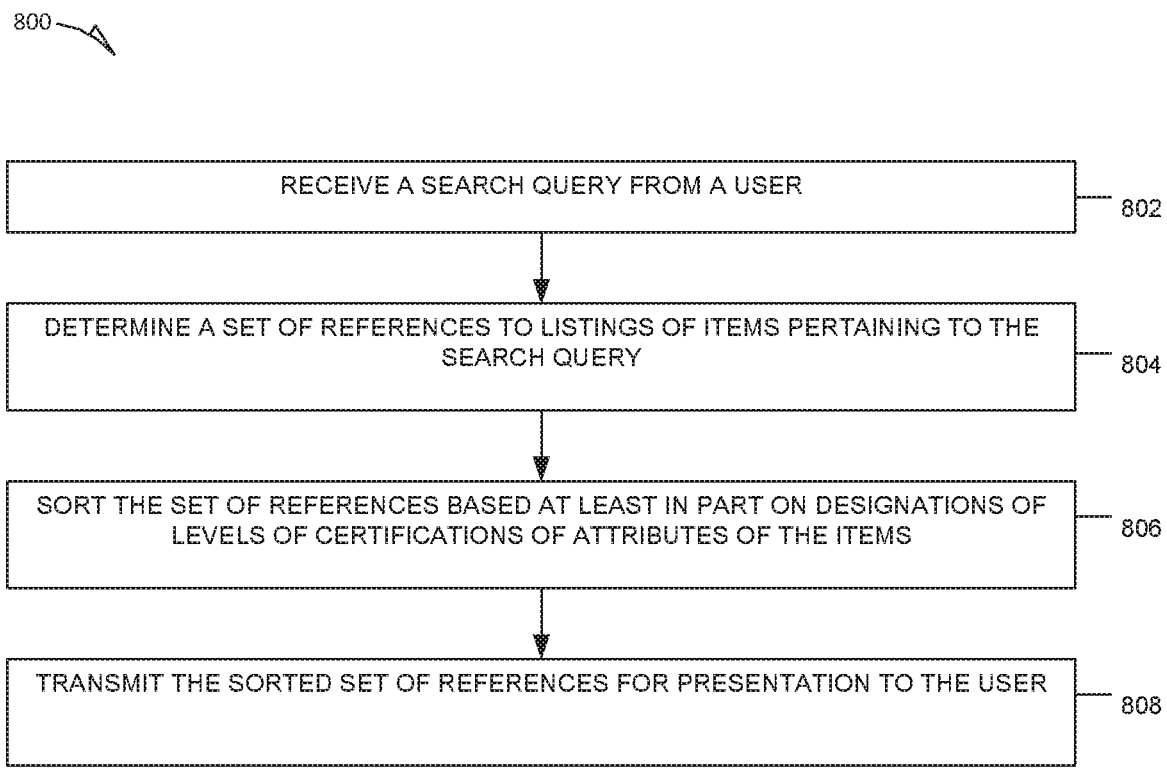
FIG. 8 is a flowchart illustrating an example method 800 of sorting a set of references to listings of items based at least in part on designations of levels of certifications of attributes of the items.

FIG. 8 is a flowchart illustrating an example method 800 of sorting a set of references to listings of items based at least in part on designations of levels of certifications of attributes of the items. Various operations of the method 800 may be performed by the item-verification application(s) 234. At operation 802, the search module receives a search query from a user. For example, the search module may receive one or more keywords entered by the user.

At operation 804, the search module 314 determines a set of references to listings of items pertaining to the search query. For example, if the keywords specified by the user in the search query include "iPhone," the search module 314 may generate references to one or more iPhones currently listed on the network-based publication system.

At operation 806, the search module 314 sorts the references based at least in part on designations of levels of certifications of attributes of the items. For example, the search module 314 may rank a first reference higher than a second reference based on the first reference pointing to a listing of an item that has a higher certification level than the item referred to by the second reference. For example, the search module 314 may rank the first reference higher than the second reference based on the item pointed to by the first listing having an expert-level certification of the first item's authenticity and the item pointed to by the second listing having only a community-level or seller-level certification of the second item's authenticity.

Or the search module 314 may rank the first reference higher than the second reference based on an aggregation of the certified attributes of the first item having a higher certification score than the second item. For example, the search module 314 may determine a first certification score for the first item of an item based on a determination that the first item has a first number of attributes having a first level of certification, a second number of attributes having a second level of certification, and so on. The search module 314 may also determine a second certification score for the second item of an item based on a determination that the second item has a first number of attributes having a first level of certification, a second number of attributes having a second level of certification, and so on. The scores may be based on weightings assigned to various attributes based on their importance to a buyer (e.g., as measured by a community of users having expertise in the type of the item). The search module 314 may then rank the first reference higher than the second reference based on the first certification score being higher than the second certification score.

At operation 808, the search module 314 may transmit the sorted set of references for presentation to the user. In various embodiments, the user who entered the query pertaining to the references may then be presented with the sorted list of references.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
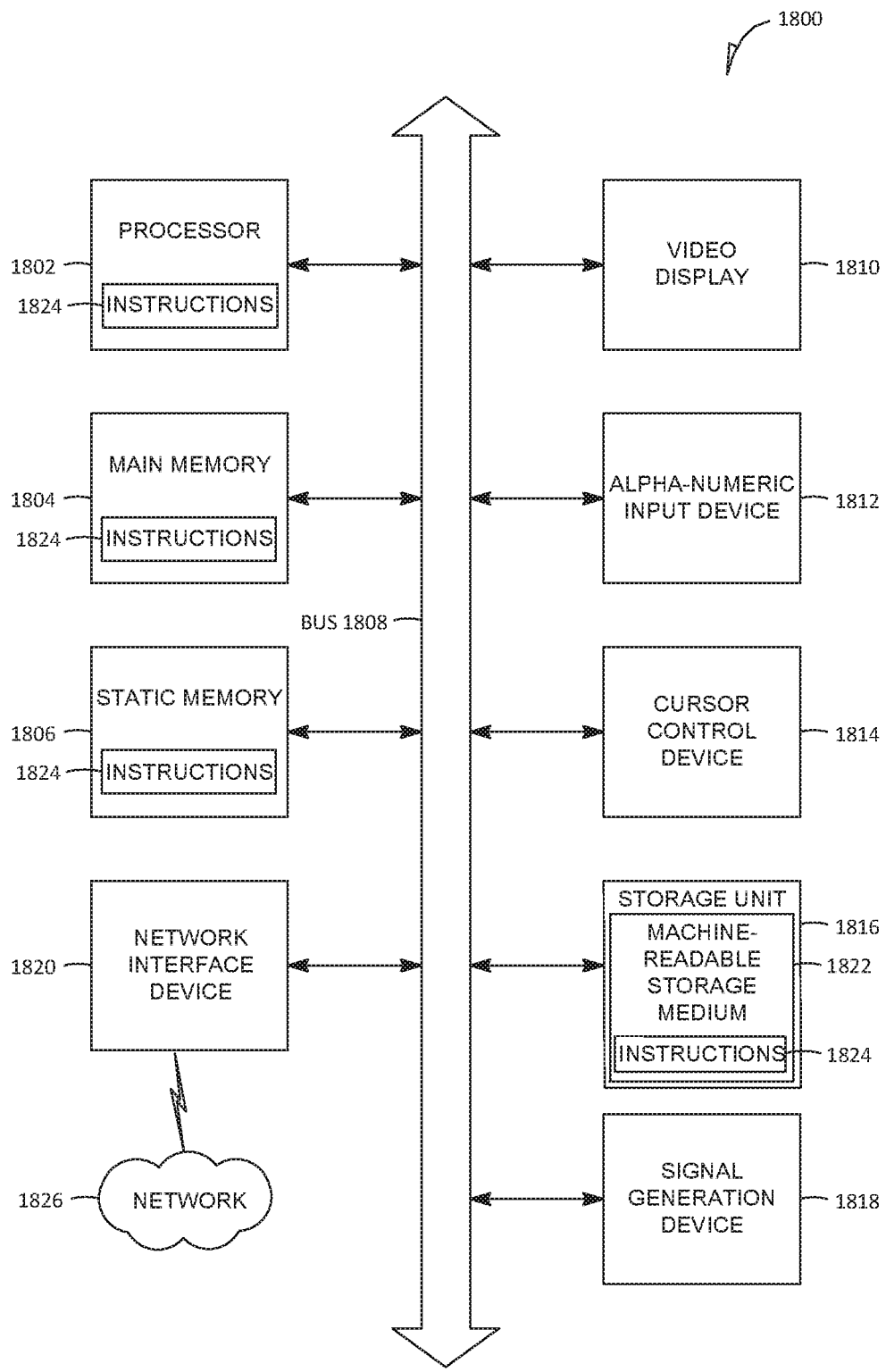
FIG. 9 is a block diagram of machine in the example form of a computer system within which instructions for causing the machine to perform any one or more of the methodologies discussed herein may be executed.

FIG. 9 is a block diagram of machine in the example form of a computer system 1800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation (or cursor control) device 1814 (e.g., a mouse), a storage unit 1816, a signal generation device 1818 (e.g., a speaker) and a network interface device 1820.

The storage unit 1816 includes a machine-readable medium 1822 on which is stored one or more sets of data structures and instructions 1824 (e.g., software) embodying or utilized by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting machine-readable media. The instructions 1824 may also reside, completely or at least partially, within the static memory 1806.

While the machine-readable medium 1822 is shown in an example embodiment to be a single medium, the term "machine-readable medium" may include a single medium or multiple media (e.g., a centralized or distributed database, and/or associated caches and servers) that store the one or more instructions 1824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1826 may be one of the networks 104.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
    one or more computer processors;
    one or more computer memories;
    one or more modules incorporated into the one or more computer memories via a computer-implemented deployment process, the one or more modules configuring the one or more computer processors of a network-based publication system to perform operations for automatically enhancing a user interface for displaying a listing of an item posted on the network-based publication system with a visual representation of a level of a certification of the item, the operations including:
    providing a notification of an evidence item that is to be electronically submitted to evaluate the level of certification for the item, the evidence item being a data item that is to be stored in a database of the network-based publication system;
    receiving the electronic submission of the evidence item;
    generating a user interface for prompting a subset of a community to provide opinions with respect to the evidence item;
    determining that the requirement for the level of certification for the item is satisfied based on a consensus of the opinions of the subset with respect to the data item indicating that the evidence item is sufficient for providing the level of certification; and
    generating the visual representation of the level of certification of the item for associating with a presentation of the listing on a client device.

2. The system of claim 1, the operations further comprising selecting the subset of the community based on an expertise of the subset with respect to a type of the item.

3. The system of claim 2, wherein the selecting includes identifying feedback received from other users in the community on contributions made by the subset to an online forum focusing on discussions pertaining to the type of the item.

4. The system of claim 1, wherein the evidence item includes an image of a serial number of the item.

5. The system of claim 1, wherein the evidence item includes a video verifying a working condition of the item.

6. The system of claim 1, wherein the determining that the requirement for the level of certification for the item is satisfied is based on a percentage of the subset deeming the evidence to be sufficient.

7. The system of claim 1, wherein the visual representation of the level of certification of the item includes an icon representing the level of the certification.

8. A method comprising:
incorporating one or more modules into one or more computer memories via a computer-implemented deployment process, the one or more modules configuring one or more computer processors of a network-based publication system to perform operations for automatically enhancing a user interface for displaying a listing of an item posted on the network-based publication system with a visual representation of a level of a certification of the item, the operations including:
providing a notification of an evidence item that is to be electronically submitted to evaluate the level of certification for the item, the evidence item being a data item that is to be stored in a database of the network-based publication system;
receiving the electronic submission of the evidence item;
generating a user interface for prompting a subset of a community to provide opinions with respect to the evidence item;
determining that the requirement for the level of certification for the item is satisfied based on a consensus of the opinions of the subset with respect to the data item indicating that the evidence item is sufficient for providing the level of certification; and
generating the visual representation of the level of certification of the item for associating with a presentation of the listing on a client device.

9. The method of claim 8, the operations further comprising selecting the subset of the community based on an expertise of the subset with respect to a type of the item.

10. The method of claim 9, wherein the selecting includes identifying feedback received from other users in the community on contributions made by the subset to an online forum focusing on discussions pertaining to the type of the item.

11. The method of claim 8, wherein the evidence item includes an image of a serial number of the item.

12. The method of claim 8, wherein the evidence item includes a video verifying a working condition of the item.

13. The method of claim 8, wherein the determining that the requirement for the level of certification for the item is satisfied is based on a percentage of the subset deeming the evidence to be sufficient.

14. The method of claim 8, wherein the visual representation of the level of certification of the item includes an icon representing the level of the certification.

15. A non-transitory machine-readable medium storing processor-executable instructions that; when executed by one or more computer processors, cause the one or more computer processors of a network-based publication system to perform operations for automatically enhancing a user interface for displaying a listing of an item posted on the network-based publication system with a visual representation of a level of a certification of the item, the operations comprising:
providing a notification of an evidence item that is to be electronically submitted to evaluate the level of certification for the item, the evidence item being a data item that is to be stored in a database of the network-based publication system;
receiving the electronic submission of the evidence item;
generating a user interface for prompting a subset of a community to provide opinions with respect to the evidence item;
determining that the requirement for the level of certification for the item is satisfied based on a consensus of the opinions of the subset with respect to the data item indicating that the evidence item is sufficient for providing the level of certification; and
generating the visual representation of the level of certification of the item for associating with a presentation of the listing on a client device.

16. The non-transitory machine-readable medium of claim 15, the operations further comprising selecting the subset of the community based on an expertise of the subset with respect to a type of the item.

17. The non-transitory machine-readable medium of claim 16, wherein the selecting includes identifying feedback received from other users in the community on contributions made by the subset to an online forum focusing on discussions pertaining to the type of the item.

18. The non-transitory machine-readable medium of claim 15, wherein the evidence item includes an image of a serial number of the item.

19. The non-transitory machine-readable medium of claim 15, wherein the evidence item includes a video verifying a working condition of the item.

20. The non-transitory machine-readable medium of claim 15, wherein the determining that the requirement for the level of certification for the item is satisfied is based on a percentage of the subset deeming the evidence to be sufficient.

* * * * *